United States Patent [19]

Kage

[11] 4,128,809
[45] Dec. 5, 1978

[54] TIME DIVERSITY RECEIVER FOR PROCESSING REPEATEDLY RECEIVED SIGNAL BITS IN CONSIDERATION OF A MAXIMUM-LEVEL AND/OR A FAVORABLY RECEIVED SIGNAL BIT

[75] Inventor: Kouzou Kage, Tokyo, Japan

[73] Assignee: Nippon Electric Co., Ltd., Tokyo, Japan

[21] Appl. No.: 829,320

[22] Filed: Aug. 31, 1977

[30] Foreign Application Priority Data

| Aug. 31, 1976 | [JP] | Japan | 51-104596 |
| Aug. 31, 1976 | [JP] | Japan | 51-104597 |
| Mar. 29, 1977 | [JP] | Japan | 52-35785 |
| Jun. 9, 1977 | [JP] | Japan | 52-68604 |
| Jun. 9, 1977 | [JP] | Japan | 52-68605 |

[51] Int. Cl.² .......................................... H04L 1/08
[52] U.S. Cl. ............................ 325/324; 340/146.1 BA
[58] Field of Search ................. 325/41, 42, 56, 65, 325/321, 323, 324; 329/104, 107; 328/162, 163; 364/514, 574, 581, 724, 737; 340/146.1 BA

[56] References Cited

U.S. PATENT DOCUMENTS

| 3,353,108 | 11/1967 | Branham | 329/107 |
| 3,787,762 | 1/1974 | Sato | 325/324 |
| 3,938,085 | 2/1976 | Battail | 340/146.1 BA |
| 3,973,242 | 8/1976 | Field et al. | 340/146.1 BA |

*Primary Examiner*—Benedict V. Safourek
*Attorney, Agent, or Firm*—Sughrue, Rothwell, Mion, Zinn and Macpeak

[57] ABSTRACT

Responsive to several signal bits carrying an information piece and received with inevitable fluctuations of the signal bit widths and height, a time diversity receiver reproduces the information piece by mainly taking the widest or highest signal bit into consideration. In order to give significance to the widest or highest signal bit, the signal bit levels are added for each information piece. When high-frequency pulses are used to derive the sum width of the signal bit widths, it is preferred to substitute pulses of a frequency equal to a half or so of the high frequency for the high-frequency pulses representative of the width of the signal bit or bits received with serious fluctuations. Alternatively, the transmitter carries out the reproduction by attaching importance to the signal bit received with smallest fluctuations either solely or together with the preference or weight put on the widest or highest signal bit.

17 Claims, 19 Drawing Figures

TIME DIVERSITY RECEIVER FOR PROCESSING REPEATEDLY RECEIVED SIGNAL BITS IN CONSIDERATION OF A MAXIMUM-LEVEL AND/OR A FAVORABLY RECEIVED SIGNAL BIT

BACKGROUND OF THE INVENTION:

This invention relates to a receiver for use in a time diversity electrical communication system.

In a time diversity electrical communication system, each signal bit carrying an information piece, such as a logic "1" or "0" value, is repeatedly transmitted a predetermined number of times from a transmitter to one or more receivers. The information piece is reproduced in the receiver with diversity reception carried out with respect to time. The time diversity communication is often resorted to, particularly when errors are liable to occur intermittently in the information pieces during transmission of the signal bits from the transmitter to the receiver through a transmission path.

As will later be described with reference to a few figures of the accompanying drawing, a conventional receiver of a time diversity communication system comprises a circuit for judging the information pieces carried by the respective received signal bits. On reproducing the information piece carried in common by the repeatedly transmitted and received signal bits, it is assumed that no appreciable errors are introduced into a majority of the information pieces carried by the received signal bits to keep the information piece nearly correct although considerable errors may appear in a minority to render the information piece incorrect. A majority logic circuit therefore decides the correct information piece by majority of the judged information pieces. The receiver, however, is not applicable to a system in which the signal bit is repeatedly transmitted an even number of times because decision by majority becomes infeasible when one and an alternative information pieces are judged to be equally probable. Although well operable for a system in which the signal bit is transmitted an odd number of times, the receiver is not sufficiently reliable because the assumption is not always applicable. For a system in which each signal bit is transmitted twice, an alternative conventional receiver comprises an Exclusive OR circuit for finding a coincidence between two information pieces obtained from a pair of repeatedly received signal bits to decide the correct information piece. The alternative receiver, however, is again unreliable because the Exclusive OR circuit gives correct results only when the two information pieces are nearly correct.

SUMMARY OF THE INVENTION

It is therefore an object of the present invention to provide a receiver for a time diversity electrical communication system, which is operable with sufficient reliability.

It is another object of this invention to provide a receiver of the type described, which is reliably operable even when a majority of information pieces carried in common by repeatedly transmitted signal bits is rendered false during transmission of the signal bits through a transmission path.

It is still another object of this invention to provide a receiver of the type described, which is reliably operable even when each signal bit is repeatedly transmitted an even or an odd number of times.

It is yet another object of this invention to provide a receiver of the type described, which is reliably operable even when each signal bit is transmitted only twice.

According to this invention, there is provided a receiver of a time diversity electrical communication system wherein a first number of signal bits forming a group and carrying information pieces, respectively, are successively transmitted from a transmitter of the system to the receiver through a transmission path in prescribed ones, respectively, of a second number of time slots of a time slot frequency. The signal bit group is repeatedly transmitted from the transmitter to the receiver a third number of times. The signal bits of the repeatedly transmitted groups are received by the receiver together with a background noise of a level variable with time. The received signal bits have levels subjected to inevitable fluctuations due to atmospheric conditions of the path and due to the noise. The receiver comprises first means for detecting the levels of the signal bits of the groups to produce first signals of levels representative of the detected signal bit levels, dividing means for dividing the first signals into groups corresponding to the respective information pieces, and second means for introducing the idea of preference or weight into the levels of the first signals for each of the first signal groups to produce a second signal representative of the result of introduction of the preference or weight. The second means successively produces the second signals for the respective first signal groups. The receiver further comprises reproducing means responsive to the second signals for reproducing the information pieces.

DESCRIPTION OF THE PREFERRED EMBODIMENTS

Figure 1:
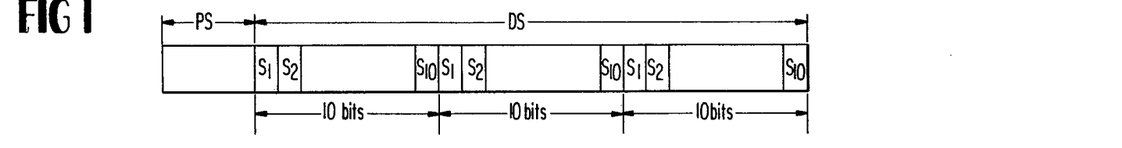
FIG. 1 schematically shows a signal pattern for use in a time diversity electrical communication system.

Referring to FIG. 1, a first number, such as ten, of first through tenth signal bits $S_1, S_2, \ldots,$ and $S_{10}$ forming a group and carrying first through tenth information pieces, respectively, are successively transmitted for time diversity communication from a transmitter of a system therefor on a carrier signal in a second number, such as ten, of time slots of a time slot frequency. Each of the signal bits may be of a level representative of a logic "1" or "0" value. The signal bit group is transmitted a third number of times, such as three times. The group therefore repeatedly appears as a first through a third group, or altogether as a data signal DS, which forms a signal pattern of the transmitted signal together with a preliminary signal PS having a predetermined pattern and preceding the data signal DS.

Figure 2:
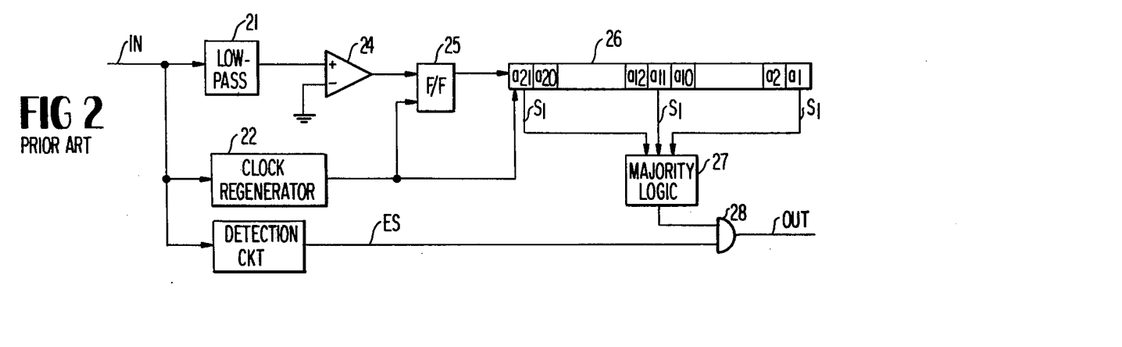
FIG. 2 is a block diagram of a conventional time diversity receiver.

Referring now to FIG. 2, a conventional receiver of a time diversity electrical communication system will be described for a better understanding of this invention. The receiver is for reproducing the information pieces carried by the signal pattern exemplified in FIG. 1 and is supplied with an input baseband signal IN comprising received signal bits $S_1, S_2, \ldots, S_{10}, S_1, \ldots, S_{10}, \ldots,$ and $S_{10}$ and reproduced from a signal transmitted from a counterpart transmitter through a transmission path by a circuit similar to one that will later be described with reference to FIG. 4. The receiver comprises a low-pass filter 21 for removing noise components from the input signal IN, a clock regenerator 22 for regenerating clock pulses $C_k$ of the time slot frequency from the input signal IN, a detection circuit 23 for detecting the preliminary signal PS with reference to the predetermined pattern and producing an enabling signal ES during one signal bit group interval from reception of the first signal bit $S_1$ in the third group, and a comparator 24 for comparing the noise-removed input signal IN with a predetermined level, such as ground, to successively determine the levels of the received signal bits. It is to be noted here that the signal bits reach the receiver together with an accompanying or background noise of a level variable with time and that the determined levels are consequently merely probable levels which result when the levels of the signal bits as transmitted are subjected to inevitable fluctuations due to atmospheric conditions of the transmission path and to the background noise and which may not thus exactly correspond to the respective levels of the transmitted signal bits.

Further referring to FIG. 2, a flip-flop 25 responsive to the clock pulses $C_k$ produces reproduced signal bits of levels depending on the probable levels. For the illustrated signal pattern, a shift register 26 has first through twenty-first stages $a_1, \ldots, a_{10}, a_{11}, a_{12}, \ldots, a_{20},$ and $a_{21}$ for storing twenty-one at a time of the reproduced signal bits in response to the clock pulses $C_k$. Those three of the stored signal bits are simultaneously supplied to a majority logic circuit 27 from the first, eleventh, and twenty-first stages $a_1, a_{11},$ and $a_{12}$ of the shift register 26 which are representative of each of the information pieces in the first through third signal bit groups. Through decision by a majority of the simultaneously supplied signal bits, the majority logic circuit 27 decides each of the transmitted information piece, which passes thoough an AND gate 28 enabled by the enabling signal to become an output signal OUT.

Figure 3:
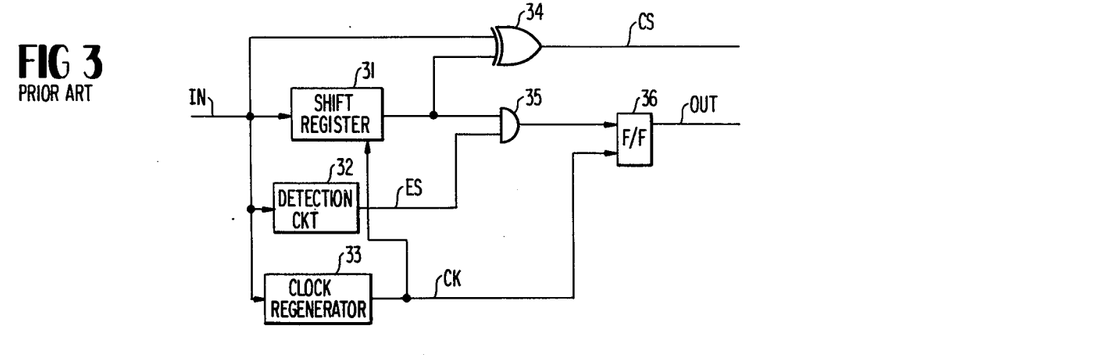
FIG. 3 is a block diagram of another conventional time diversity receiver.

Referring to FIG. 3, an alternative conventional receiver is for a time diversity communication system wherein each signal bit group is repeatedly transmitted only twice. The receiver comprises a clock regenerator 22 and a detection circuit 23 of the types described in conjunction with FIG. 2. The enabling pulse ES starts at an instant of the first signal bit $S_1$ in the second or final signal bit group. The receiver further comprises a shift register 31 for giving in response to the clock pulses $C_k$ a delay of one signal bit group interval to the signal bits of the input signal IN. An Exclusive OR gate 34 is supplied simultaneously with those two of the signal bits at a time which are representative of each information piece in the respective groups. When these two signal bits are not coincident, the Exclusive OR gate 34 produces a caution signal CS to inform the transmitter of the fact that the transmitter should suspend transmission and again transmit the signal pattern. Otherwise, the received bits of probable levels pass through an AND gate 35 to make a flip-flop 36 produce reproduced signal bits as an output signal OUT.

The conventional receivers are disadvantageous as pointed out in the preamble of the instant specification, although that illustrated with reference to FIG. 3 is somewhat different from that described there.

Figure 4:
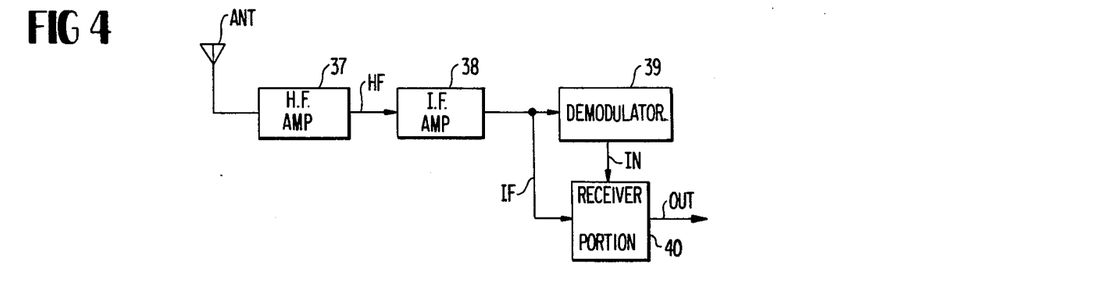
FIG. 4 is a general block diagram of a receiver according to any of the preferred embodiments of this invention including a receiver portion.

Referring to FIG. 4, a receiver according to the preferred embodiments of this invention comprises an antenna ANT for catching a high frequency signal, transmitted from a counterpart transmitter with the signal pattern, such as that exemplified in FIG. 1, a high frequency amplifier stage 37 for amplifying the high frequency signal to produce an amplified high frequency signal HF, and an intermediate frequency stage 38 for converting the high frequency signal HF into an intermediate frequency signal IF. The receiver further comprises a demodulator stage 39 for converting the intermediate frequency signal IF into an input baseband signal IN of the signal pattern, and a receiver portion 40 for reproducing as an output signal OUT information pieces from the input signal IN with reference to the intermediate frequency signal IF as will later be described.

Figure 5:
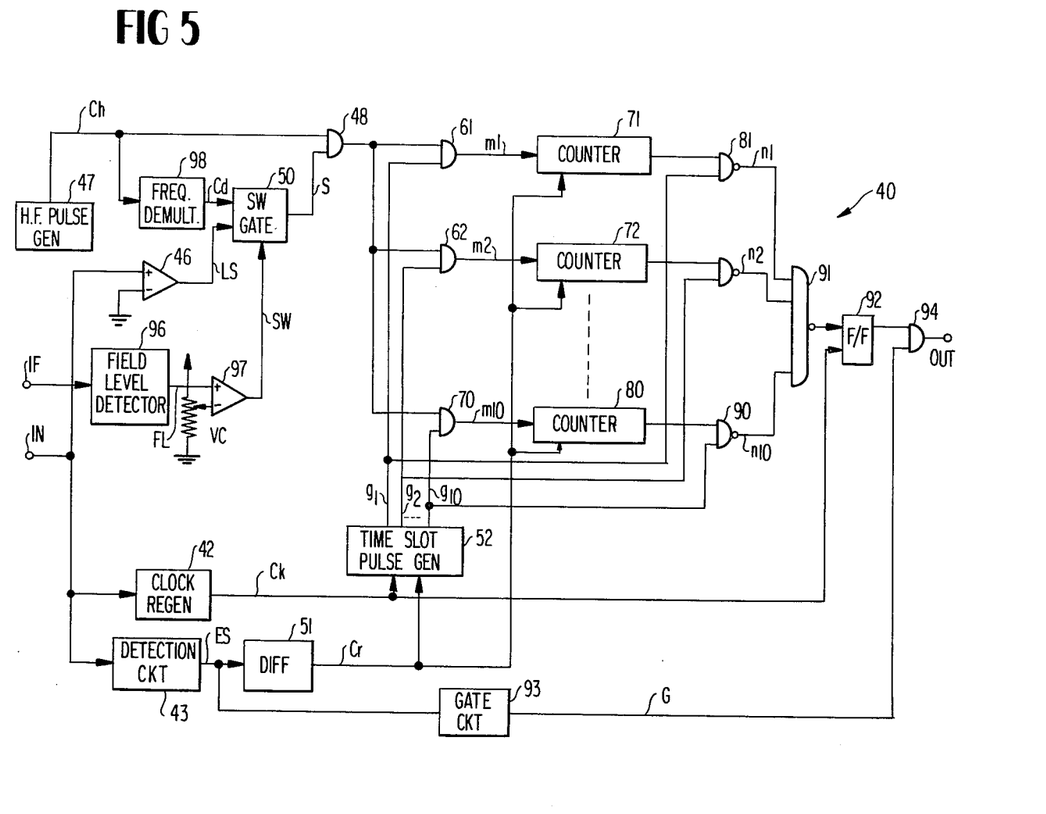
FIG. 5 is a block diagram of the receiver portion of a receiver according to a first embodiment of this invention.

Referring now to FIG. 5, a receiver according to a first embodiment of this invention comprises a receiver portion 40 for the signal pattern illustrated with reference to FIG. 1. It is to be noted here that levels of the received or detected signal bits comprised by the input signal IN have variable signal bit width as a result of the inevitable fluctuations. The receiver portion 40 comprises a clock regenerator 42 and a detection circuit 43 for producing clock pulses $C_k$ and an enabling signal ES as described in conjunction with FIGS. 2 and 3 except that the enabling signal ES builds up at the instant of the first time slot of the first signal bit group. Like the comparator 24 shown in FIG. 2, a first comparator 46 compares the received signal bit levels with a preselected reference level, such as ground, to discriminate whether or not the signal bit levels are on a preselected side of the reference level and to produce level signals LS as a first signal S only when the signal bit levels are on the preselected side of the reference level. A timer pulse generator 47 generates timer pulses $C_h$ of a repetition frequency higher than the time slot frequency. A first AND gate 48 is enabled by the level signals LS supplied thereto through a switching gate 50, described later, to allow the timer pulses $C_h$ pass there through to become first signal groups or blocks of the timer pulses of numbers corresponding to the respective received signal bit widths.

Referring further to FIG. 5, a differentiator 51 produces a preset and a reset pulse $C_r$ in response to the leading and trailing edges of the enabling signal ES. Preset by the preset pulse $C_r$ and responsive to the clock pulses $C_k$, a time slot pulse generator 52 produces a sequence of time slot pulses $g_1, g_2, \ldots$, or $g_{10}$ in synchronism with each of the time slots in the respective signal bit groups. Enabled by the time slot pulses of the respective time slot pulse sequences $g_1-g_{10}$, second AND gates 60, 61, ..., and 70, equal in number to the first number, divide the timer pulse blocks into first through tenth block sequences $m_1, m_2, \ldots$, and $m_{10}$ corresponding to the respective information pieces and serving as first through tenth first signal groups. As a result, the first timer pulse block sequence $g_1$, for example, consists of timer pulse blocks which have passed through the AND gate 48 while the first signal bits $S_1$ of the respective signal bit groups are on the preselected side of the reference level and each of which consists of timer pulses $C_k$ of numbers representative of the signal bit width. Responsive to the preset pulse $C_r$, a counter 71, 72, ..., or 80 counts the timer pulses of each of the timer pulse block sequences $m_1-m_{10}$ to derive a count of the counted timer pulses as a total width of the signal bit widths representative of the common information piece of the first signal bit $S_1$. The counters 71–80 are responsive to a predetermined or threshold value TH and deliver count signals to NAND gates 81, 82, ..., and 90 when the counts delivered in the respective counters 71–80 reach the threshold value TH.

The NAND gates 81–90 are supplied also with the respective time slot pulse sequences $g_1-g_{10}$ to supply second signals $n_1-n_{10}$ to a common NAND gate 91 for supplying the second signals $n_1-n_{10}$ as a series second signal to a flip-flop circuit 92. Responsive to the enabling signal ES, a gate signal circuit 93, which may be a one-shot multivibrator, produces a gate signal G that is an exact equivalent of the enabling signal ES described in conjunction with FIG. 2. A second or output AND gate 94 is equivalent to the AND gate 28 shown in FIG. 2. The first one of the second signals $n_1$, for example, is produced with preference or weight given with reference to the threshold value TH to those of the first time pulse block sequence $m_1$ which consist of the timer pulses of a maximum number. In other words, the timer pulse block, if any, is neglected on producing the second signal $n_1$ which consists of only a small number of timer pulses as a result of serious fluctuations.

Referring still further to FIG. 5, the receiver portion 40 comprises a field level detector 95 responsive to the intermediate frequency signal IF for detecting S/N ratios at instants of the respective received signal bits to produce as a third signal a sequence of field level signals FL representative of the respective S/N ratios. A second comparator 97 compares the field level signals FL with a predetermined reference level $V_c$ to produce a control or switching signal SW only when the signal bits are received under favorable circumstances, namely, without a serious fluctuation. A frequency demultiplier 98 demultiplies the respective frequency of the timer pulses $C_h$ by a predetermined factor to produce a substitution signal $C_d$ of a predetermined pulse pattern. Preferably, the predetermined factor is one half, when the substitution signal $C_d$ has a duty cycle of 50%. In the absence of the switching signal SW, the switching gate 50 substitutes the substitution signal $C_d$ for the level signal LS to supply the first signal S of modified levels to the first AND gate 48. Even when two of the signal bits received three times for each information piece represent incorrect information pieces, substitution of the substitution signal for unmodified level signals LS enables the reproduced information piece of the output signal OUT to be correct.

Figure 6:
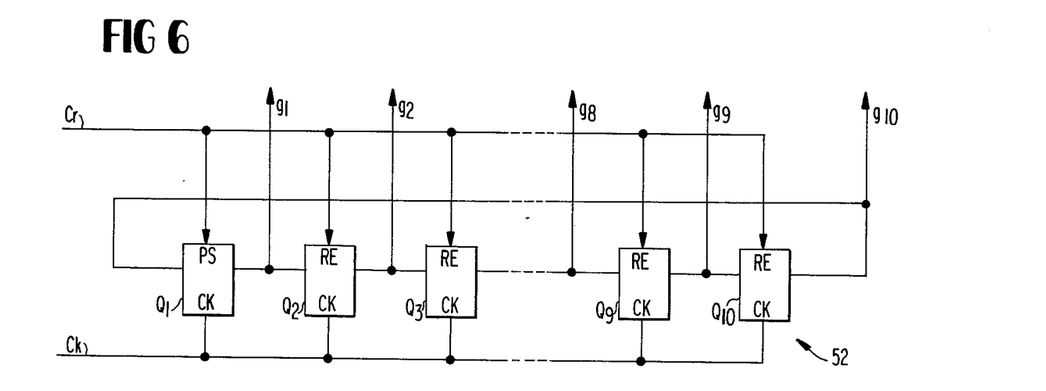
FIG. 6 is a circuit diagram of a time slot pulse generator used in the receiver portion illustrated in FIG. 5.

Referring to FIG. 6, the time slot pulse generator 52 is a shift register comprising first through tenth flip-flops $Q_1, Q_2, Q_3, \ldots, Q_9$, and $Q_{10}$ which have clock terminals CK supplied with the clock pulses $C_k$. The first flip-flop $Q_1$ has a preset terminal PS while the second through tenth flip-flops $Q_2-Q_{10}$ have reset terminals RE. Both preset and reset pulses $C_r$ are supplied to the preset and reset terminals. The flip-flops $Q_1-Q_{10}$ have input and output terminals connected so that the shift register may serve as a ring counter put into operation by the preset pulse $C_r$ to count the clock pulses $C_k$ and produce the first through tenth time slot pulse sequences $g_1-g_{10}$ from the output terminals of the first through tenth flip-flops $Q_1-Q_{10}$, respectively.

Figure 7:
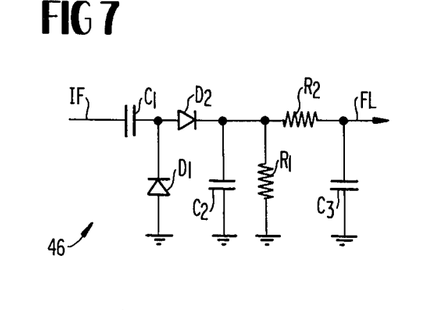
FIG. 7 is a circuit diagram of a field level detector used in the receiver portion shown in FIG. 5.

Referring to FIG. 7, the level detector 96 comprises first and second diodes $D_1$ and $D_2$, first and second capacitors $C_1$ and $C_2$, and a first resistor $R_1$ serving in combination as a rectifying and smoothing circuit and a third capacitor $C_3$ and a second resistor $R_2$ serving as a filter circuit. When the intermediate frequency signal IF is of a sufficient level, namely, when a signal bit is received under favorable circumstances, the level detector 96 produces the third signal FL of a high level. Otherwise, the third signal FL has a low level. The filter removes a quicker response, if any, from the third signal FL.

Figure 8:
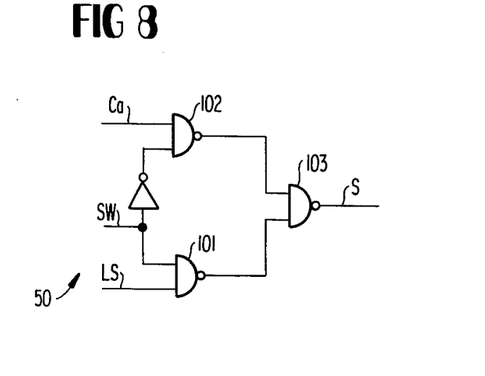
FIG. 8 is a circuit diagram of a switching gate circuit used in the receiver portion depicted in FIG. 5.

Referring to FIG. 8, the switching gate circuit 50 comprises a first NAND gate 101 supplied with the unmodified level signals LS and the switching signal SW, a second NAND gate 102 supplied with the switching signal SW through an inverter and directly with the substitution signal $C_d$, and a third NAND circuit 103 connected to the first and second NAND circuits 101–102. While the switching signal SW is kept low, the first signal S consists of the unmodified level signals as produced by the first comparator 46. Otherwise, the first signal S consists of the substitution signal $C_d$.

Figure 9:
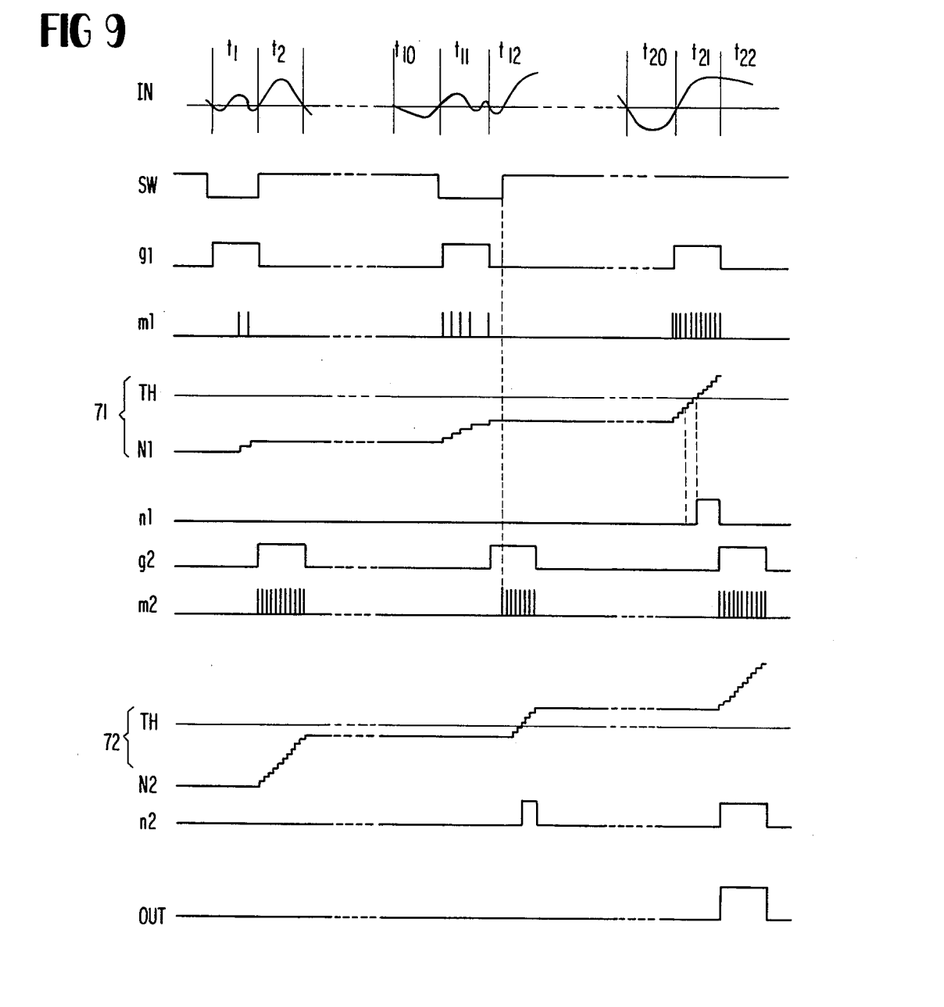
FIG. 9 is a time chart for specifically describing operation of a receiver according to the first embodiment.

Turning to FIG. 9, description will be made mere specifically of operation of the receiver portion illustrated with reference to FIG. 5. In FIG. 9, the first line exemplifies the signal bit levels of the input beseband signal IN produced at first, second, and tenth time slots $t_1, t_2, t_{10}, t_{11}, t_{12}$, and $t_{20}$ of the first and second signal bit group intervals and first and second time slots $t_{21}$ and $t_{22}$ of the third signal bit group interval. It is surmised that the first and second signal bit levels and the tenth bit level as repeatedly transmitted are high and low, respectively, and that the first signal bits of the first and second signal bit groups are received with serious fluctuations as shown at $t_1$ and $t_{11}$ while others are received under favorable circumstances as depicted at $t_2$, $t_{10}$, $t_{12}$, $t_{20}$, $t_{21}$, and $t_{22}$. As illustrated in the second line, the switching signal SW becomes low in the first time slots $t_1$ and $t_{11}$ of the first and second signal bit group intervals. In response to the timer slot pulses of the first sequence $g_1$ produced as depicted in the third line, the first timer pulse block sequence $m_1$ as called hereinabove and shown in the fourth line consists of only two and five pulses $C_d$ in the first time slots $t_1$ and $t_{11}$ of the first and second signal bit group intervals and eleven timer pulses $C_h$ in the first time slot $t_{21}$ of the third signal bit group interval. As illustrated in the fifth line, a count $N_1$ in the first counter 71 rises above the threshold value TH. A second signal $n_1$ of high level is therefore produced as shown in the sixth line.

Responsive to the time slot pulses of the second sequence $g_2$ produced as depicted in the seventh line, the second timer pulse block sequence $m_2$ as shown in the eighth line are counted up in the second time slots $t_2$, $t_{12}$, and $t_{22}$ of the respective signal bit groups. As illustrated in the ninth line, a count $N_2$ in the second counter 72 already reaches the threshold level TH at a middle of the second time slot $t_{12}$ in the second signal bit group interval. A second signal $n_2$ of a high level is therefore produced at the second time slots $t_{12}$ and $t_{22}$ of the second and the third signal bit groups as shown in the tenth line. As shown in the eleventh line, the second AND gate 93 produces as the output signal OUT the reproduced signal bit only in response to the second signal $n_2$ produced in the third signal bit group.

Figure 10:
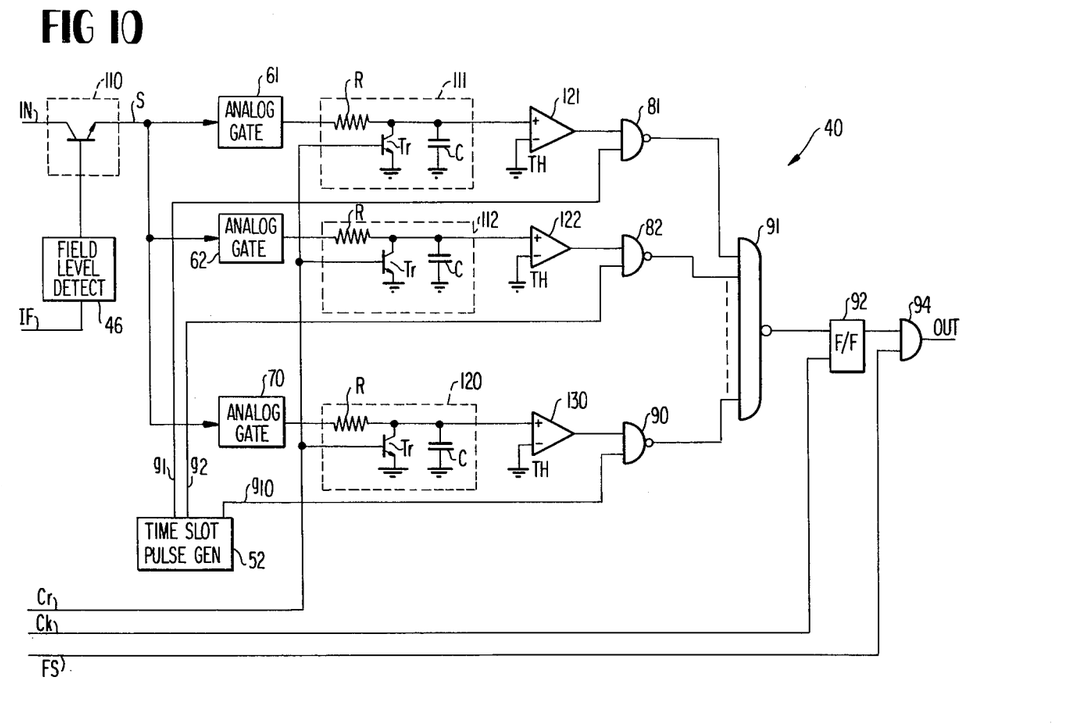
FIG. 10 is a block diagram of the receiver portion of a receiver according to a second embodiment of this invention.

Referring now to FIG. 10, a receiver according to a second embodiment of this invention comprises a receiver portion 40 responsive to the input baseband signal IN and the intermediate frequency signal IF for the signal pattern illustrated with reference to FIG. 1. It should be noted here that levels of the received or detected signal bits comprised by the input signal IN have variable signal bit amplitudes as a result of the inevitable fluctuations. The receiver portion 40 produces the output signal OUT by giving the preference or weight to the maximum amplitude of the signal bits carrying each of the information pieces. The receiver portion 40 comprises a time slot pulse generator 52, first through tenth analog gates 61-70, first through tenth NAND gates 81-90, a common NAND gate 91, a flip-flop circuit 92, an output AND gate 94, and a field level detector 96, all similar to the corresponding elements designated by like reference numerals in FIG. 5, and is operable in response to the clock pulses $C_k$, preset and reset pulses $C_r$, first through tenth time slot pulse sequences $g_1$-$g_{10}$, gate signal G, and field level signal FL as described in conjunction with FIG. 5. Only when the switching signal SW is high, a single analog gate 110 comprising a transistor supplies the received signal bits as a first signal S to first through tenth analog gates 61-70, which supply first signal groups $m_1$-$m_{10}$ to integration or adder circuits 111, 112, . . . , and 120. As a consequence, the received signal bits are not supplied to the integration circuits 111-120 when the field level signal FL indicates unfavorable circumstances of reception of the signal bits.

The integration circuits 111-120 are for integrating or summing up the signal bit amplitudes of the respective first signal groups to produce total amplitude signals representative of the summed or total amplitudes. Each of the integration circuit 111-120 comprises a transistor Tr for resetting the output total amplitude signal to zero in response to the reset pulse $C_r$ and, for confirmation, also by the preset pulse $C_r$. The integration circuit further comprises a resistor R and a capacitor C for summing up the signal bit amplitudes of a pertinent one of the first signal groups. Comparators 121, 122, . . . , and 130 compare the total amplitude with a threshold value TH and supply the results of comparison to the first through tenth NAND gates 81-90, which produce second signals $n_1$-$n_{10}$.

Figure 11:
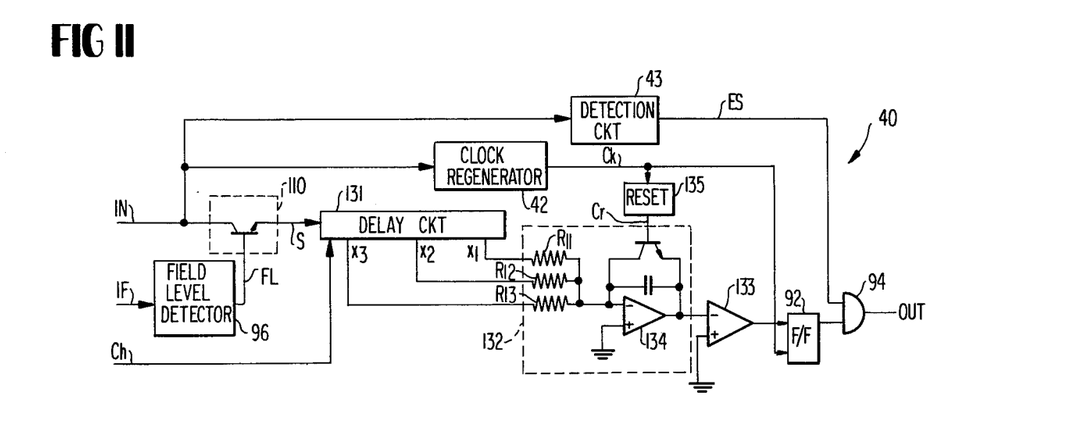
FIG. 11 is a block diagram of the receiver portion of a receiver according to a third embodiment of this invention.

Referring to FIG. 11, a receiver according to a third embodiment of invention comprises a receiver portion 40 similar in operation to that illustrated with reference to FIG. 10. Elements and signals equivalent to those described in conjunction with FIGS. 5 and 10 are designated by like reference symbols, such as 42, 43, 92, 94, 96, 110, IN, IF, OUT, $C_k$, ES, S, $C_h$, and FL. The receiver portion 40 comprises an analog delay circuit 131 having taps $x_1$, $x_2$, and $x_3$, equal in number to the third number described with reference to FIG. 1, for delaying the first signal S to simultaneously supply the signal bits received for each of the information piece to an integration circuit 132 for summing up the amplitudes of the simultaneously produced signal bits. In the illustrated example, the delay circuit 131 is supplied with the high-frequency timer pulses $C_h$ and may be as a backet brigate device (BBD) or a charge coupling device (CCD). The integration circuit 132 supplies a total amplitude signal representative of a total amplitude or the summed amplitudes to a comparator 133 for comparing the total sum with a threshold value to successively produce the second signals.

The integration circuit 132 comprises three resistors $R_{11}$, $R_{12}$, and $R_{13}$ for deriving a sum of amplitudes of the signal bits simultaneously supplied thereto for each of the information pieces, a Miller integrator comprising for the sum an operation amplifier 134 and a shunting capacitor for producing the total amplitude signals with noise components removed, and a reset transistor. Responsive to the clock pulses $C_k$, a reset signal circuit 135 supplies reset pulses $C_r$ to the reset transistor at the end of the respective time slots and thereby to make the integration circuit 132 ready for the signal bits for the next succeeding information piece. A single comparator 136 is substituted for the comparators 121-130 described in conjunction with FIG. 11.

Figure 12:
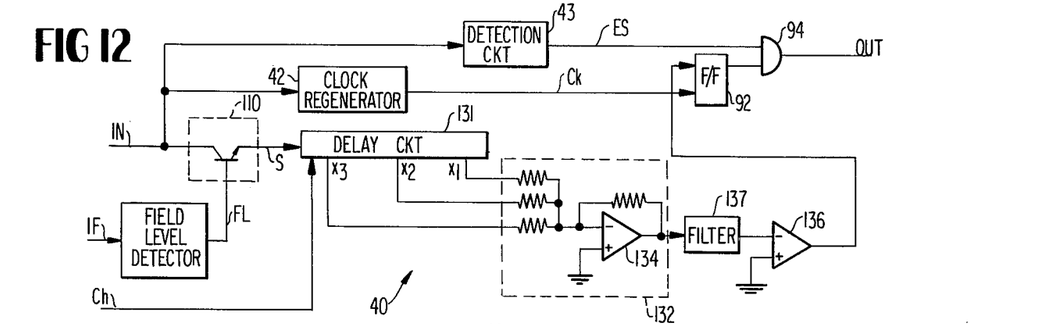
FIG. 12 is a block diagram of the receiver portion of a receiver according to a fourth embodiment of this invention.

Referring to FIG. 12, a receiver according to a fourth embodiment of this invention comprises a receiver portion 40 operable like the receiver portion illustrated with reference to FIG. 11 except that the operation amplifier 134 is not accompanied by the shunting capacitor and the reset transistor but a shunting resistor. The noise components are removed by a filter 137 interposed between the integration circuit 132 and the single comparator 136.

Figure 13:
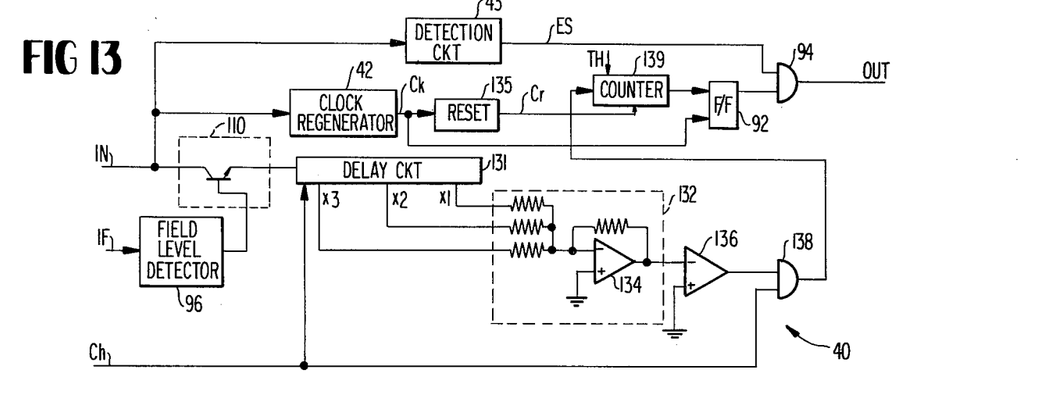
FIG. 13 is a block diagram of the receiver portion of a receiver according to a fifth embodiment of this invention.

Referring to FIG. 13, a receiver according to a fifth embodiment of this invention comprises a receiver portion 40 similar to those illustrated with reference to FIGS. 11 and 12 except that the preference or weight is given to a maximum received signal bit width rather than to a maximum received signal bit amplitude. The receiver portion 40 therefore comprises an AND gate 138 similar to the first AND gate 48 (FIG. 5) responsive to the output signals of the successive output signals of the single comparator 136 for producing a sequence of timer pulse blocks, each consisting of timer pulses of a number representative of a relevant one of the comparator output signals. Responsive to the reset pulses $C_r$ described in connection with FIG. 11, a single counter 139 counts the timer pulses in each of the timer pulse blocks to derive a count representative of a total signal bit width and produces the second signals when the counts for the respective timer pulse blocks reach a threshold value TH.

Figure 14:
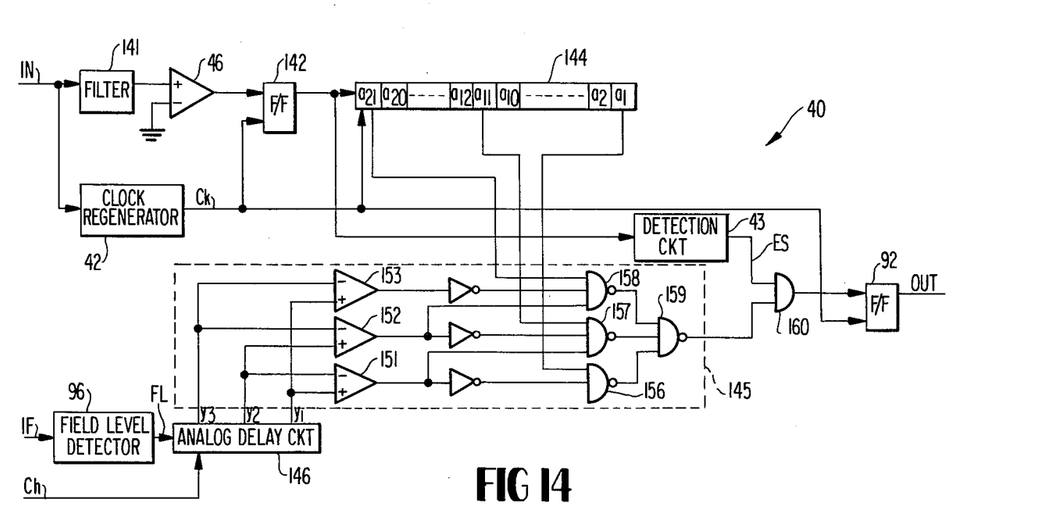
FIG. 14 is a block diagram of the receiver portion of a receiver according to a sixth embodiment of this invention.

Referring now to FIG. 14, a receiver according to a sixth embodiment of this invention comprises a receiver portion 40 responsive to the input baseband signal IN and the intermediate frequency signal IF for producing the output signal OUT with the preference or weight given to that signal bit of the signal bits successively received for each information piece which is received under the most favorable circumstances. The receiver portion 40 comprises a clock regenerator 42, a detection circuit 43, a comparator 46, an output flip-flop circuit 92, and a field level detector 96 similar to the equivalent elements depicted in FIG. 5 and is operable in response to the clock pulses $C_k$, the enabling signal ES, the timer pulses $C_h$, and the field level signals FL described in conjunction with FIG. 5. A filter 141 for removing noise components from the input signal IN is placed prior to the comparator 46. Responsive to the clock pulses $C_k$, an input flip-flop circuit 142 produces reproduced signal bits of probable levels of the received signal bits. The detector circuit 43 is responsive to the reproduced signal bits rather than to the input signal IN. A shift register 144, similar to the shift register 26 (FIG. 2), simultaneously supplies the reproduced signal bits for each of the information piece to a maximum likelihood detection circuit 145. Responsive to the high-frequency timer pulse $C_h$, an analog delay circuit 146, similar to the analog delay circuit 131 (FIGS. 11–13), simultaneously supplies the maximum likelihood detection circuit 145 with first through third field level signals representative of the respective S/N ratios of the reproduced signal bits simultaneously supplied from the taps $a_1$, $a_{11}$, and $a_{21}$ of the shift register 144.

The maximum likelihood detection circuit 145 comprises three comparators 151, 152, and 153 for comparing the simultaneously produced field level signal pairs to produce comparison signals when the first, second, and first field level signals are greater than the second, third, and third field level signals, respectively. Supplied with the comparison signals directly and through inverters, three NAND gates 156, 157, and 158 and a common NAND gate 159 supplies an output AND gate 160 with that one of the simultaneously reproduced signal bits as the second signal which is received under the most favorable circumstances. Responsive to the second signal of the most probable signal bit level, the output flip-flop circuit 92 produces the output signal OUT.

Figure 15:
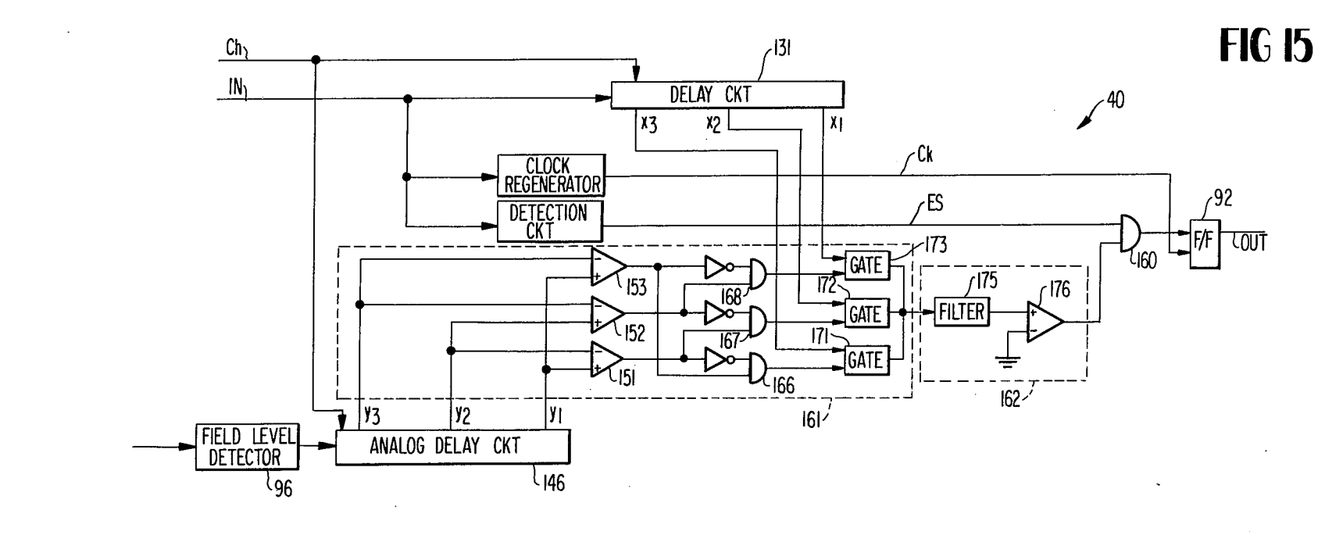
FIG. 15 is a block diagram of the receiver portion of a receiver according to a seventh embodiment of this invention.

Turning to FIG. 15, a receiver according to a seventh embodiment of this invention comprises a receiver portion 40 operable like the receiver portion illustrated with reference to FIG. 14. The arrangements for simultaneously producing the signal bits repeatedly received for each of the information pieces and producing the corresponding field level signals are similar to the corresponding arrangements described in conjunction with FIGS. 11 and 14, respectively. The maximum likelihood detection circuit 145 (FIG. 14) comprises a maximum detection circuit 161 and a level comparison circuit 162 operable as analog circuits. In the maximum detection circuit 161, the three comparators 151–153 supply the comparison signals to three two-input AND gates 166, 167, and 168 directly and through inverters. Responsive to the output signals of the AND gates 166–168 and the received signal bits of the taps $x_1$–$x_3$, three analog gates 171, 172, and 173 select that one of the signal bits received for each of the information pieces, for which the circumstances are most favorable. The level comparison circuit 162 comprises a filter 175 for removing noise components from the most favorably received signal bit and a comparator 176 for comparing the noise-free most favorably received signal bit with a threshold level to produce a relevant one of the second signals.

Figure 16:
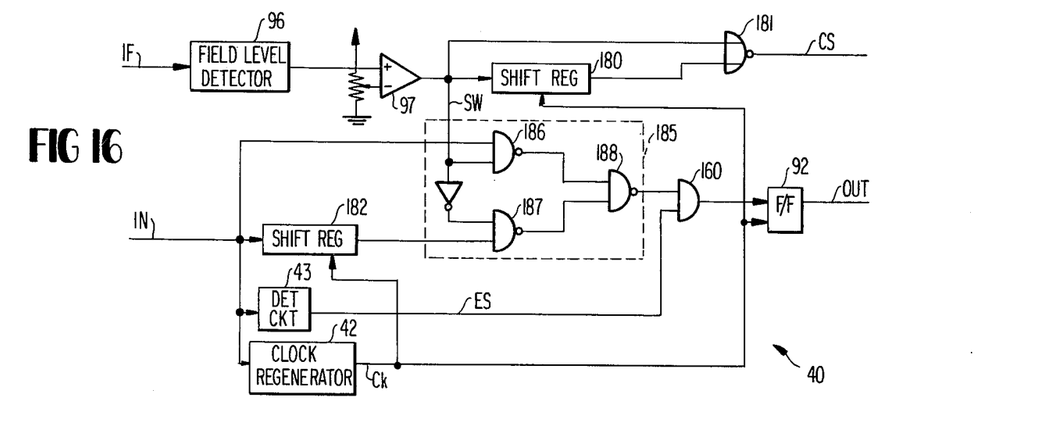
FIG. 16 is a block diagram of the receiver portion of a receiver according to an eighth embodiment of this invention.

Referring to FIG. 16, a receiver according to an eighth embodiment of this invention comprises a receiver portion 40 for the signal pattern in which the signal bit group is transmitted and received repeatedly only twice. The receiver portion comprises a clock regenerator 42 and a detection circuit 43 supplied with the input baseband signal IN per se as the first signals for producing the clock pulses $C_k$ and the enabling signal ES, respectively, as described in connection to FIG. 5, an output flip-flop circuit 92 for the output signal OUT illustrated in FIG. 14, a field level detector 96 responsive to the intermediate frequency signal IN for producing the field level signals FL and a comparator 97 for the control signal SW shown in FIG. 1, and an output AND gate 160 depicted in FIG. 14. The receiver portion 40 further comprises a first shift register 180 for giving a delay of ten bits to the control signal SW and a NOR gate 181 responsive to the delayed and undelayed control signals for producing a caution signal CS as the shift register 31 and Exclusive OR gate 34 do in the alternative conventional receiver. A second shift register 182 gives a delay of ten bits to the received signal bits to produce the first signals of a delayed group. A selection circuit 185 is supplied with the first signals of an undelayed group and those of the delayed group, namely, with the input signal IN rearranged into the simultaneously produced first signals, one each of the undelayed and the delayed groups.

The selection circuit 185 comprises a first NAND gate 186 supplied with the first signals of the undelayed group and the control signal SW, a second NAND gate 187 supplied with the first signals of the delayed group directly and the control signal SW through an inverter, and a third NAND gate 188 for the NAND gates 186–187. The selection circuit 185 therefore produces, at each of the time slots of the delayed signal bit group interval, one of the first signals of the delayed and undelayed groups that is selected with reference to the control signal SW produced at the above-mentioned each time slot.

Figure 17:
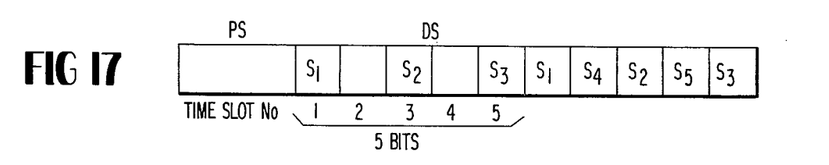
FIG. 17 shows a signal pattern which is applicable to a receiver of the type illustrated in FIG. 16.

Turning to FIG. 17, a signal pattern for a time diversity receiver of the type illustrated with reference to FIG. 16 may comprise a preliminary signal PS and a data signal DS which comprises, in turn, first, second, and third signal bits $S_1$, $S_2$, and $S_3$ in first, third, and fifth time slots, respectively, of a first signal bit group interval of five time slots. The signal bit group is twice repeatedly transmitted with fourth and fifth signal bits $S_4$ and $S_5$ added in second and fourth time slots of the second signal bit group interval.

Figure 18:
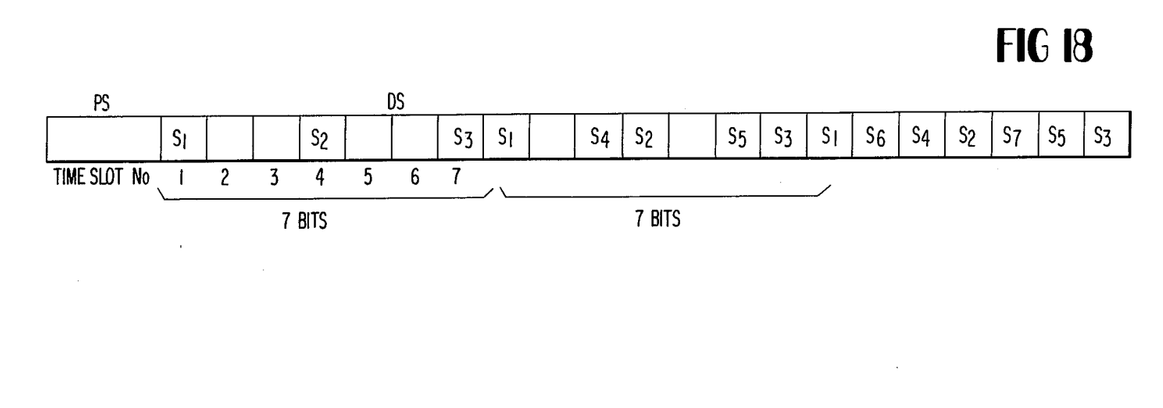
FIG. 18 shows another signal pattern applicable to any of receivers of the types shown in FIGS. 11–15.

Turning further to FIG. 18, another signal pattern for time diversity communication comprises a preliminary signal PS and a data signal DS which comprises, in turn, first, second, and third signal bits $S_1$, $S_2$, and $S_3$ in first, fourth, and seventh time slots, respectively, of a first signal bit group interval of seven time slots. The signal bit group is repeatedly transmitted three times. In the second signal bit group, fourth and fifth signal bits $S_4$ and $S_5$ are added in third and sixth time slots. The third signal bit group is supplemented with sixth and seventh signal bits $S_6$ and $S_7$ in the remaining time slot. The signal pattern of the exemplified type is applicable to time diversity receivers of the types illustrated with reference to FIGS. 12-15, wherein the signal bits repeatedly transmitted from the transmitter with a given information piece are processed in the receiver in a time division fashion rather than in a space division fashion.

Figure 19:
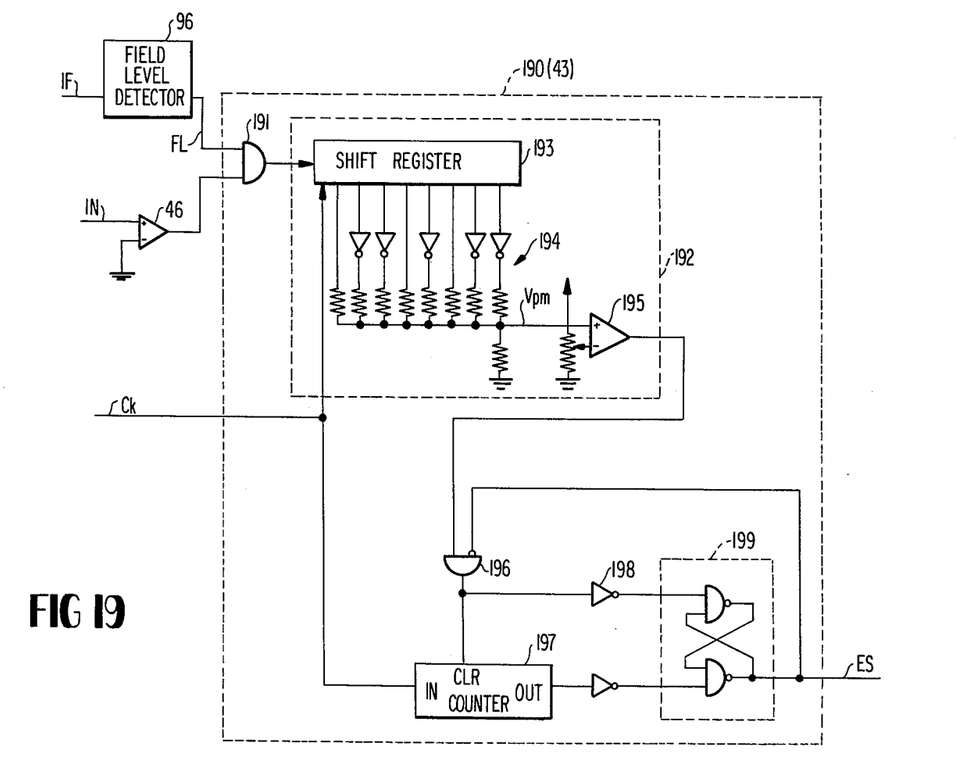
FIG. 19 is a block diagram of a preliminary signal detector for use in any of the respective embodiments of this invention.

Finally referring to FIG. 19, a detection circuit 190 may be substituted for the detection circuit 43 used in any of the receivers according to the preferred embodiments. Responsive to the level signals LS, field level signals FL, and clock pulses $C_k$, the detection circuit 190 produces the enabling signal ES when the preliminary signal PS is received under considerably favorable circumstances. In the illustrated example, the predetermined pattern is assumed to be "10010100" of eight bits. An input AND gate 191 is supplied with the level signals LS and the field level signals FL and allows the preliminary signal PS to pass therethrough only when the field level signals FL indicate the favorable circumstances. Driven by the clock pulses $C_k$, a pattern matching circuit 192 detects the predetermined pattern. More particularly, the circuit 192 comprises an eight-stage shift register 193 serving as a series-to-parallel converter for the preliminary signal PS, a patterned adder 194 responsive to bit-parallel output signals of the shift register 193 for producing a sum signal $V_{pm}$ of a considerably high level when the bit-parallel signals have a pattern approximately equal to the predetermined pattern, and a level comparator 195 for comparing the sum signal $V_{pm}$ with a preselected comparison level to produce an output signal when the preliminary signal PS is received with incorrect bits within an allowable number preselected by the comparison level.

Through an intermediate AND gate 196 enabled by the enabling signal ES which is usually of a low level, the output signal of the pattern matching circuit 192 is supplied to a clear terminal CLR of a counter circuit 197 for counting the clock pulses $C_k$ and, through an inverter 198, to a flip-flop 199. The flip-flop 199 is thereupon set to render the enabling signal ES high. The counter circuit 197 counts the clock pulses $C_k$ to the second number mentioned above to reset the flip-flop 199 through another inverter and to return the enabling signal ES to the low level. It is readily possible to give the pattern-matched output a delay a predetermined number of the signal bit group interval.

What is claimed is:

1. In a receiver of a time diversity electrical communication system wherein a first number of signal bits forming a group and carrying information pieces, respectively, are successively transmitted from a transmitter of said system to said receiver through a transmission path in prescribed ones, respectively, of a second number of time slots of a time slot frequency, said signal bit group being repeatedly transmitted from said transmitter to said receiver a third number of times, the signal bits of the repeatedly transmitted groups being received by said receiver together with a background noise of a level variable with time, the received signal bits having levels subjected to inevitable fluctuations due to atmospheric conditions of said path and due to said noise, a combination which comprises:

first means for detecting the levels of the signal bits of said groups to produce first signals of levels representative of the detected signal bit levels;
dividing means for dividing said first signals into groups corresponding to the respective information pieces;
second means for introducing the idea of preference or weight into the levels of the first signals for each of said first signal groups to produce a second signal representative of the result of introduction of the preference or weight, said second means successively producing the second signals for the respective first signal groups; and
reproducing means responsive to said second signals for reproducing said information pieces.

2. A receiver as claimed in claim 1, wherein said second means comprises:
first processing means for summing up the levels of the first signals for each of said first signal groups to derive a total level signal representative of a total level of the summed up first signal levels; and
second processing means responsive to a predetermined value and said total level signal for comparing said total level with said predetermined value to produce the second signal for said each first signal group with the preference or weight given with reference to said predetermined value to a maximum of the first signal levels summed up into said total level;
said second processing means successively producing in cooperation with said first processing means the second signals for the respective first signal groups.

3. A receiver as claimed in claim 2, said detected signal bit levels having variable widths as a result of said inevitable fluctuations and said background noise, the first signals of said first signal groups thus representing said widths, respectively, wherein:
said first processing means comprises adder means for summing up the widths represented by the first signals for each of said first signal groups to derive as said total level signal a total width signal representative of a total width of the summed up first signal widths;
said second processing means thereby producing the second signal for each of said first signal groups with the preference or weight given with reference to said predetermined value to the widest of the first signal widths summed up into said total width.

4. A receiver as claimed in claim 3, wherein:
said first means comprises:
means responsive to a preselected reference level for discriminating whether or not the detected levels of the signal bits of said signal bit groups are on a preselected side of said reference level to produce level signals only when said detected signal bit levels are on said preselected side of said reference level;
a timer pulse generator for generating timer pulses of a repetition frequency higher than said time slot frequency;
a first gate enabled by said level signals for allowing the timer pulses to pass therethrough to become blocks of the timer pulses of numbers corresponding to the respective widths of said detected signal bit levels; and
means for supplying the timer pulse blocks to said dividing means as said first signals, respectively;
said dividing means comprising:

a time slot pulse generator for generating a sequence of time slot pulses in synchronism with each of said prescribed time slots in the respective signal bit groups;

second gates, equal in number to said first number, enabled by the time slot pulses of the respective time slot pulse sequences for dividing said timer pulse blocks into sequences corresponding to the respective information pieces; and means for supplying said timer pulse block sequences to said first processing means as the respective first signal groups;

said first processing means comprising a counter for counting the timer pulses of the blocks of each of said timer pulse block sequences to derive as said total width a count of the counted timer pulses;

said second processing means comprising threshold means operatively coupled to the counters for the respective timer pulse block sequences and responsive to said predetermined value for making said counters produce said second signals when the count in each of said counters reaches said predetermined value, said threshold means thereby producing said second signals with the preference or weight given with reference to said predetermined value to those of said timer pulse blocks which consist of the timer pulses of maximum numbers in the respective timer pulse block sequences.

5. A receiver as claimed in claim 2, said detected signal bit levels having variable amplitudes as a result of said inevitable fluctuations and said background noise, the first signals of said first signal groups thus representing said amplitudes, respectively, wherein:

said first processing means comprises adder means for summing up the amplitudes represented by the first signals of each of said first signal groups to derive as said total level signal a total amplitude signal representative of a total amplitude of the summed up first signal amplitudes;

said second processing means thereby producing the second signal for each of said first signal groups with the preference or weight given with reference to said predetermined value to the greatest of the first signal amplitudes summed up into said total amplitude.

6. A receiver as claimed in claim 5, wherein said dividing means comprises delay means having taps, equal in number to said third number, for delaying the first signals supplied from said first means to produce said first signal groups from the respective taps.

7. A receiver as claimed in claim 6, said delay means being analog delay means, the first signals of said first signal groups thereby having widths dependent on their respective amplitudes, said total amplitude signal thereby having a width dependent on said total amplitude, wherein said second processing means comprises:

integrating means for integrating said total amplitude signal to produce an integrated signal of an amplitude dependent on said total amplitude signal width; and threshold means responsive to said predetermined value and said integrated signal for comparing said integrated signal amplitude with said predetermined value to produce the second signal for said each first signal group with the preference or weight given with reference to said predetermined value to the greatest of the first signal amplitudes summed up into said total amplitude.

8. A receiver as claimed in claim 6, said delay means being analog delay means, the first signals of said first signal groups thereby having widths dependent on their respective amplitudes, said total amplitude signal thereby having a width dependent on said total amplitude, wherein said second processing means comprises:

converting means for converting said total amplitude signal to a converted signal of a width representative of said total amplitude signal width; and threshold means responsive to said predetermined value and said converted signal for comparing said converted signal width with said predetermined value to produce the second signal for said each first signal group with the preference or weight given with reference to said predetermined value to the greatest of the first signal amplitudes summed up into said total amplitude.

9. A receiver as claimed in claim 2, wherein:

said dividing means comprises:

a time slot pulse generator for generating a sequence of time slot pulses in synchronism with each of said prescribed time slots in the respective signal bit groups; and gate circuits, equal in number to said third number, enabled by the time slot pulses of the respective time slot pulse sequences for dividing the first signals supplied from said first means into said first signal groups;

said first processing means comprising integrators for integrating the first signals of the respective first signal groups to produce said total level signals for the respective first signal groups.

10. A receiver as claimed in claim 2, further comprising:

third means for detecting whichever of said background noise level and ratios of said noise level to the levels of the successively received signal bits to produce a third signal of a level variable with time and representative of whether or not the signal bits are successively received under favorable circumstances;

said first means comprising:

means for detecting said signal bit levels to produce bit detection signals of unmodified levels; and modifying means for modifying said bit detection signals into said first signals with said unmodified levels modified into said detected signal bit levels depending on said third signal.

11. A receiver as claimed in claim 10, wherein said modifying means comprises:

means for producing a substitution signal of a predetermined pulse pattern; and means for modifying the bit detection signals produced in the presence of said control signal into the first signals with said substitution signal substituted for the last-mentioned bit detection signals.

12. A receiver as claimed in claim 10, wherein said modifying means comprises:

means for producing the bit detection signals produced in the presence of said third signal as said first signals.

13. A receiver as claimed in claim 1, further comprising:

third means for detecting whichever of said background noise level and ratios of said noise level to the levels of the successively received signal bits to produce a third signal of a level variable with time and representative of whether or not the signal bits are successively received under favorable circumstances;
said second means comprising:
signal producing means responsive to said third signal for producing a selection signal when said third signal level represents said favorable circumstances; and
selection means responsive to the first signals of each of said first signal groups and to said selection signal for selecting as one of said second signals that one of the last-mentioned first signals which is supplied thereto from said dividing means in the presence of said selection signal to introduce the preference or weight in accordance with said selection signal into the level of the selected first signal.

14. A receiver as claimed in claim 13, wherein:
said signal producing means comprises:
means for dividing said third signal into simultaneously produced third signal bits, equal in number to said third number, having levels representative of the third signal level at each of the prescribed time slots in the respective signal bit groups; and
means responsive to said third signal bits for finding that one of said third signal bits, the level of which is a maximum of said third signal bit levels, to produce said one third signal bit as said selection signal.

15. A receiver as claimed in claim 13, each of said signal bits being a logic signal of a level representative of one of two logic values according to the information piece carried thereby, said first signal levels thereby representing said two logic values, said signal producing means producing said selection signal of a level representative of one of said two logic values according to said third signal level, wherein:
said selection means comprises:
rearranging means for rearranging those of the first signals of each of said first signal groups which are successively supplied thereto from said dividing means to simultaneously produce the last-mentioned first signals; and
gate means responsive to said control signal and said simultaneously produced first signals for producing as one of said second signals a logic signal of a level representative of that one of said two logic values which is represented by the level of the first signal supplied to said rearranging menas in the presence of said control signal, thereby giving the preference or weight in accordance with said control signal to the last-mentioned first signal level.

16. A receiver as claimed in claim 15, wherein said signal producing means comprises:
means for dividing said third signal into simultaneously produced third signal bits, equal in number to said third number, having levels representative of the third signal level at each of the prescribed time slots in the respective signal bit groups; and
discriminating means for discriminating said third signal bit levels to produce a caution signal when the third signal level represented by none of said third signal bits represent said favorable circumstances.

17. A receiver as claimed in claim 16, wherein said discriminating means comprises means having a plurality of taps, equal in number to said third number, for shifting said third signal bits to produce said third signal bits.

* * * * *

UNITED STATES PATENT AND TRADEMARK OFFICE
CERTIFICATE OF CORRECTION

PATENT NO. : 4,128,809
DATED : December 5, 1978
INVENTOR(S) : Kouzou KAGE

It is certified that error appears in the above-identified patent and that said Letters Patent are hereby corrected as shown below:

IN THE SPECIFICATION:

Column 4, line 8 - delete "$a_{12}$" insert -- $a_{21}$ -- line 13 - delete "piece" insert -- pieces -- line 14 - delete "thoough" insert -- through --

Column 5, line 26 - delete "60"

line 66 - after "detector" delete "95" insert -- 96 --

Column 6, line 60 - delete "mere" insert -- more -- line 63 - delete "beseband" insert -- baseband --

Column 8, line 2 - delete "circuit" insert -- circuits -- line 24 - delete "piece" insert -- pieces -- lines 28 & 29 - delete "backet brigate" insert -- bucket brigade --

UNITED STATES PATENT AND TRADEMARK OFFICE
CERTIFICATE OF CORRECTION

PATENT NO. : 4,128,809

DATED : December 5, 1978

INVENTOR(S) : Kouzou KAGE

It is certified that error appears in the above-identified patent and that said Letters Patent are hereby corrected as shown below:

IN THE SPECIFICATION:

Column 9, line 32 - delete "piece" insert -- pieces --

IN THE CLAIMS:

Column 16, line 14 - delete "menas" insert -- means --

Signed and Sealed this

Seventeenth Day of April 1979

[SEAL]

Attest:

RUTH C. MASON
*Attesting Officer*

DONALD W. BANNER
*Commissioner of Patents and Trademarks*